United States Patent [19]

Housset et al.

[11] Patent Number: 5,792,500
[45] Date of Patent: Aug. 11, 1998

[54] PROCESS FOR THE CONTINUOUS PREPARATION OF CHEESE OR A CHEESE PRODUCT INSTALLATIONS FOR PRACTICING THE PROCESS AND PRODUCT OBTAINED BY THE PROCESS

[75] Inventors: Roger Housset, Neuvy Sautour; Mickael Caillard, Auxerre; Michel Merceron, Chablis, all of France

[73] Assignee: Bongrain (societe anonyme), Guyancourt, France

[21] Appl. No.: 601,129

[22] Filed: Feb. 14, 1996

[30] Foreign Application Priority Data

Feb. 15, 1995 [FR] France ................. 95 01727

[51] Int. Cl.$^6$ ................. A01J 25/00; A23C 3/02
[52] U.S. Cl. ................. 426/582; 426/36; 426/518; 426/5; 99/453; 99/461; 99/462; 99/483
[58] Field of Search ................. 99/452, 460, 453, 99/461, 462, 483; 426/36, 39, 41, 42, 43, 516, 518, 582

[56] References Cited

U.S. PATENT DOCUMENTS 3,562,910  2/1971  Runge et al. ................. 99/453
4,091,721  5/1978  Cosmi ................. 99/453
4,580,490  4/1996  Jorgensen ................. 99/452

*Primary Examiner*—David A. Redding
*Attorney, Agent, or Firm*—Young & Thompson

[57] ABSTRACT

A method of continuously manufacturing a cheese or a cheese speciality from curds, the method comprising the following steps:

a) raw materials including at least broken curds are inserted into a screw extruder (10) inside a sheath (11);

b) the raw materials are transferred inside the sheath which has at least one section in which the temperature lies in the range 60° C. to 85° C., the configuration of the screws (12) and the temperature inside the sheath (11) being adapted to transforming the raw materials by mixing, texturing, and cooking;

c) the resulting product is extruded from the downstream end of the sheath (11) through a die adapted to texture, shape, and cool the product; and d) the extruded cheese or cheese speciality is cut to a desired length.

13 Claims, 2 Drawing Sheets

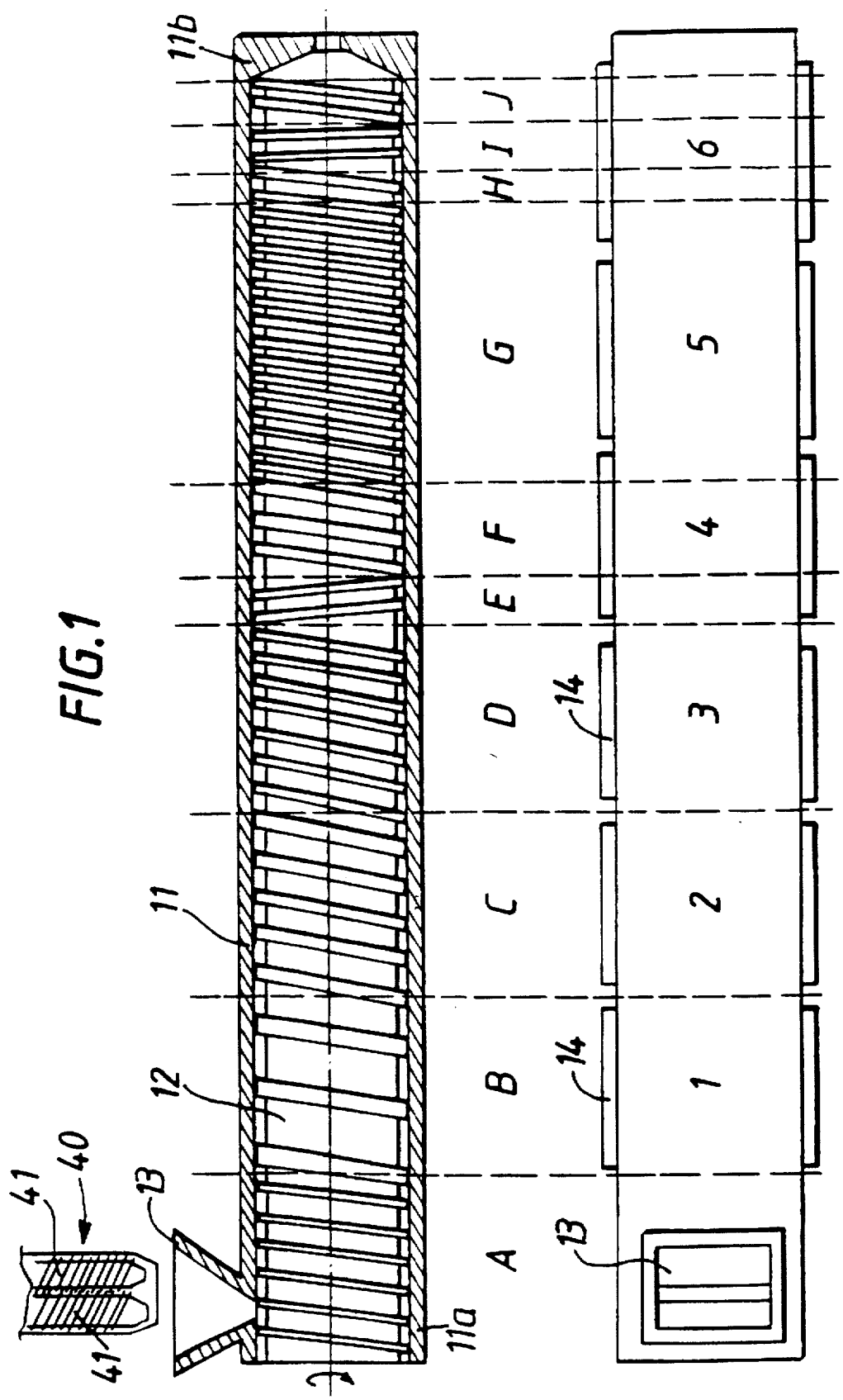

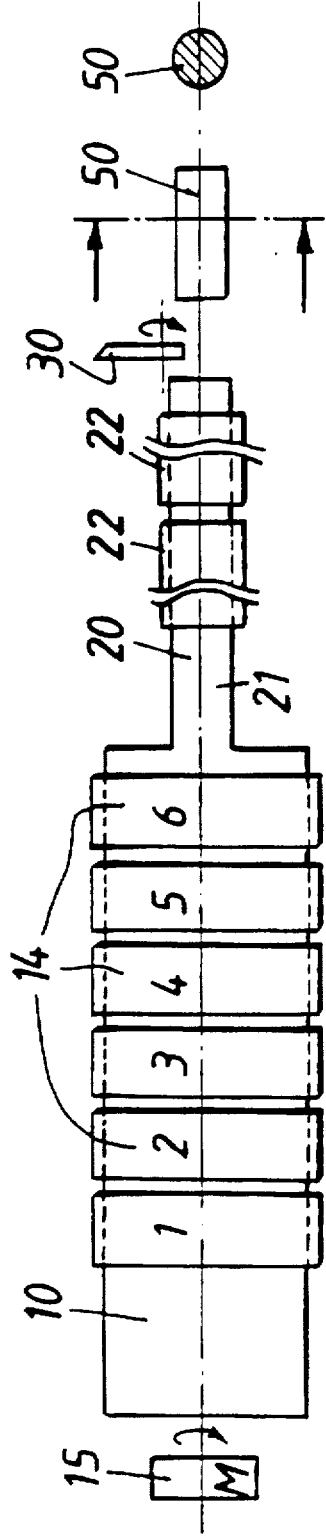
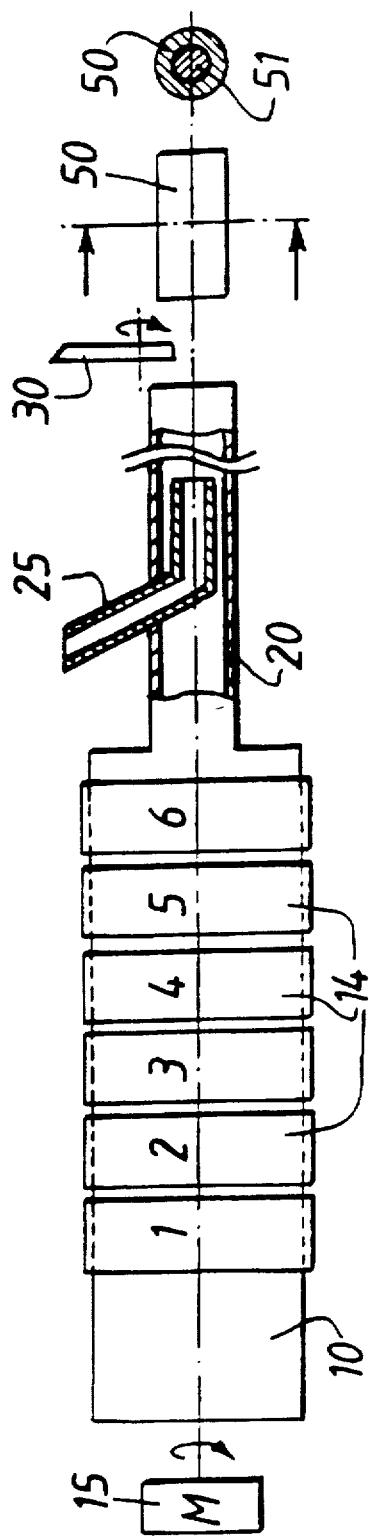

PROCESS FOR THE CONTINUOUS PREPARATION OF CHEESE OR A CHEESE PRODUCT INSTALLATIONS FOR PRACTICING THE PROCESS AND PRODUCT OBTAINED BY THE PROCESS

The present invention relates to a method of continuously manufacturing a cheese or a cheese speciality from curds and/or the residue of milk ultrafiltration.

The invention also relates to a manufacturing installation for implementing the method and to a food product having the taste and the texture of a cheese or a cheese speciality.

Methods of continuously manufacturing a cheese or a cheese speciality have already been proposed in the past.

In particular, document FR-2 516 356 discloses a method in which the operations of adding rennet to milk, curdling, and molding are performed continuously. Nevertheless, the product obtained by molding must then be drained to acquire its cheese texture.

A method of continuously manufacturing composite cheese by coextrusion is also described in document EP-0 358 983. In that document, a plurality of drained cheese curds are coextruded, and that is done at a temperature less than or equal to ambient temperature.

Similarly, document U.S. Pat. No. 3,562,910 describes a continuous manufacturing process in which a coherent mass of curds is obtained from particles of drained and salted curds.

However, the operations of stirring the curds, acidification, adjusting the dry extract, salting, and optionally incorporating additional ingredients in the curds are performed in traditional manner in a curd breaker and a kneader upstream from the extruder.

An object of the present invention is to propose a method of continuously manufacturing a cheese or a cheese speciality from curds and/or the residue from milk ultrafiltration. The method makes it possible to eliminate the traditional operations of adjusting the dry extract, expansion, thermal stabilization, texturing, and shaping.

According to the invention, the method of continuously manufacturing a cheese or a cheese speciality is characterized in that it comprises the following steps:

a) feeding raw materials comprising at least broken curds and/or residue to a screw extruder having two screws that are substantially identical, meshing one within the other, and rotated in the same direction of rotation inside an elongate sheath;

b) transferring the raw materials from the upstream end towards the downstream end of the sheath, the configuration of the screws and the temperature inside the sheath going from the upstream end towards the downstream end being adapted to subject the raw materials successively to a step in which they are compressed, mixed, and heated to a temperature of about 120° C., a step in which they are sheared and mixed, followed by a decompression step at a temperature lying in the range 55° C. to 120° C. depending on the product; a step of compression, mixing, and heating to a temperature lying in the range 55° C. to 120° C., and a step in which the product is sheared, mixed, and transferred into a die at a temperature lying in the range 50° C. to 120° C.;

c) extruding the resulting product from the downstream end of the sheath through a die adapted to texturing, shaping, and cooling the product; and d) cutting up the extruded cheese or cheese speciality to a desired length.

By means of the invention, a cheese or cheese speciality type food product is obtained in a single operation from broken curds and/or residue from milk ultrafiltration.

In an advantageous version of the invention, the cheese or cheese speciality is filled with a filling injected via a coextrusion head that opens out into the die.

The method of the invention thus also makes it possible to obtain two-component cheese products in continuous manner.

According to another aspect of the invention, a food product having the taste and the texture of a cheese or a cheese speciality, is characterized by the fact that it is prepared continuously using broken curds and/or residue from milk ultrafiltration in a screw extruder heated to the range 60° C. to 120° C., and followed by an extrusion die.

According to a third aspect of the invention, a manufacturing installation for implementing the method of the invention, comprises a screw extruder having two substantially identical screws meshing one in the other and rotated in the same direction of rotation inside an elongate sheath, a feed orifice disposed at an upstream end of the sheath, an extrusion die situated at the downstream end of said sheath, and a slicer disposed at the outlet from the extrusion die.

This manufacturing installation is characterized in that it includes a metering device adapted to deliver broken curds and/or residue from milk ultrafiltration to the feed orifice at a predetermined rate, thermal means adapted to regulate the temperature inside the sheath and the extrusion die, said sheath including at least one section in which the temperature lies in the range 60° C. to 120° C., the configuration of the screws and the temperature inside the sheath inside the extrusion die being adapted to transforming raw materials comprising at least broken curds and/or residue from milk ultrafiltration into a cheese or a cheese speciality.

Other features and advantages of the invention appear further from the following description.

In the accompanying drawings, given as non-limiting examples:

FIG. 1 is a diagrammatic section of a screw extruder in a manufacturing installation of the invention;

FIG. 2A shows a manufacturing installation comprising a first embodiment of the invention;

FIGS. 2B and 2C show a food product obtained at the outlet from the manufacturing installation of FIG. 2A;

FIG. 3A is a diagram of a manufacturing installation comprising a second embodiment of the invention; and FIGS. 3B and 3C show a food product obtained at the outlet from the manufacturing installation of FIG. 3A.

We begin by describing a manufacturing installation for implementing the method of the invention.

As shown in FIGS. 2A and 3A, the installation comprises a screw extruder 10 having two substantially identical screws 12 that mesh one in the other and that are rotated in the same direction of rotation inside an elongate sheath 11.

The use of such a screw extruder is well known in the manufacture of cocktail snacks, breakfast cereals, or instant flours.

A motor 15 serves to rotate the two screws 12 engaged one within the other, optionally via a stepdown gear box.

By way of example, the driving power may be equal to 25 kW.

The screws are preferably self-cleaning and the sheath may be moved manually in translation in its longitudinal direction to facilitate access to the screws.

Naturally, the materials used for manufacturing the sheath and the screws are compatible with food.

As shown in FIG. 1, a feed orifice 13 is located at or near an upstream end 11a of the sheath 11. This feed orifice 13 receives raw materials to be processed in the screw extruder 10, i.e. in particular broken curds and/or the residue from milk ultrafiltration, together with other ingredients.

Below, in this text, the particular raw material taken into consideration is broken curds. It should be understood that the raw material could equally well be residue from milk ultrafiltration, on its own or in combination with curds.

The sheath 11 may also include openings (not shown in the figures) for secondary feeds along the path of the screws 12.

An extrusion die 20 is situated at the downstream end 11b of the sheath, and a slicer 30 is placed at the outlet from the extrusion die 20.

In known manner, the extrusion die 20 has a diameter that is smaller that the diameter of the bore of the sheath 11, so as to compress the transferred matter.

The slicer is preferably a rotary knife 30 whose speed of rotation is adjusted as a function of the length of product that it is desired to obtain.

In accordance with the invention, the installation includes a metering device 40 (shown in FIG. 1) adapted to deliver broken curds to the feed orifice 13 at a predetermined rate. This device is a single screw metering device with weight regulation specially designed to dispense a moist substance at a given rate. The rate can affect the final texture of the product if the capacity of the installation for providing sufficient mechanical work is exceeded.

The two screws 41 serve to break up the curds and cause them to be delivered in the form of particles to the screw extruder 10.

Thermal means 14, 21 are adapted to adjust the temperature inside the sheath 11 and the extrusion die 20, with the sheath having at least one section in which the temperature lies in the range 60° C. to 120° C., depending on the product. In the embodiment shown in the figures, the screw extruder 10 has six heater modules 14 distributed in its longitudinal axial direction.

Fine regulation to within about plus or minus 1° C. makes it possible to maintain each section of the sheath 11 at a given temperature.

The configuration of the screws 12 and the temperature inside the sheath 11 of the extrusion die 20 are adapted to transform the raw materials comprising at least broken curds into a cheese or a cheese speciality.

The term "configuration" as applied to a screw in this context means the position of its threads, the thickness of its threads, and their spacing, which corresponds to the pitch of the screw. The configuration of the screw, and in particular the positioning of the reverse threads is adapted to the thermal profile in the sheath in such a manner as to transform the raw materials inserted into the screw extruder in application of a method as described below.

As shown better in FIG. 1, the screw extruder 10 comprises, from an upstream end towards a downstream end: a first zone A into which the raw materials are fed and in which the temperature is equal to ambient temperature and the screws 12 have very thin threads at a short pitch. By way of example, the thickness of the thread may be equal to about 2 mm with the pitch of the screw being equal to about 25 mm. This feed first zone A may extend over about 20 cm. The broken curd feed orifice 13 opens out into this zone.

A compression second zone B, C, D in which temperature increases going downstream through the range about 15° C. to about 120° C. and where the screws 12 have threads of decreasing thickness and a pitch that decreases from a long value to a short value, is adjacent to the feed first zone A.

This second zone may comprise three sections B, C, D of equal length, each being about 20 cm long for example, in which the screw threads are successively as follows: about 15 mm thick and spaced about at about 50 mm; about 10 mm thick and spaced apart at about 35 mm; and about 7 mm thick and spaced apart at about 25 mm. The decreasing thread thickness and shortening screw pitch in this second zone serve to obtain progressive compression of the treated matter in three successive stages.

In parallel with this screw configuration, an increasing thermal profile is established inside the sheath 11 by means of three heater modules 1, 2, and 3 corresponding to the sections B, C, D, respectively. The temperature of the first module preferably lies in the range 15° C. to 30° C. depending on the product, and in the present embodiment it is equal to 22° C. The temperature of the second heater module 2 lies in the range about 55° C. to about 65° C. and is equal on average to about 60° C. The temperature of the third heater module 3 lies in the range 65° C. to 120° C. depending on the product, and is equal to 75° C. in the present embodiment.

Downstream from this compression second zone, there is situated a shear third zone E in which the screws 12 have a short reverse pitch. This third zone E extends substantially over about 5 cm, with the screws having reverse threads that are 7 mm thick and a pitch of about 25 mm.

This third zone E is immediately followed by a decompression fourth zone in which the temperature lies in the range 55° C. to 120° C., depending on the product. The screw threads are reversed again relative to those of the shear third zone E, i.e. they are disposed so as to transfer raw material from the upstream end towards the downstream end of the sheath. The temperature in the third zone E and in the fourth zone F preferably lies in the range 55° C. to 120° C. depending on the product, and it is equal to 70° C. in the present embodiment. This temperature is preferably less than that reached in the compression second zone B, C, D.

A compression fifth zone G is situated downstream from the fourth zone F, and the pitch of the screws 12 therein is very short. This fifth zone G preferably extends over a length equal to about 30 cm. The screw threads are about 7 mm thick and they are spaced apart at about 15 mm.

The temperature in the fifth zone G is regulated by a heater module 5 and it is preferably maintained in the range 55° C. to 120° C., depending on the product, and it is equal to 70° C. in the present embodiment.

Finally, the downstream ends of the screws 12 include a transfer sixth zone H, I, J in which the screws have a short pitch equal to about 25 mm. The thickness of the threads in this transfer zone is equal to about 7 mm.

This sixth zone comprises, going from the upstream end towards the downstream end: a first section H of length equal to about 2.5 cm; then a shear second section I in which the screws 12 have reverse pitch, said second section I being preferably about 50 mm long; and then a third section J of identical length in which the screws 12 have their threads reversed again so as to transfer the resulting product into the extrusion die 20.

The temperature in this transfer sixth zone is adjusted by the heater module 6 and it lies in the range 50° C. to 120° C. depending on the product, and it is equal to 70° C. in the present embodiment.

The speed of the screws 12 as driven by the motor 15 lies in the range about 100 revolutions per minute (rpm) to about 250 rpm, and it is equal to about 150 rpm in the present embodiment. The transit time for the matter treated by the screw extruder 20 is of the order of a few minutes only.

The total length of the screw 12 is thus equal to about 1,375 mm, and the length of the sheath is about 1,400 mm.

At the outlet from the conveyor, the resulting product has a temperature lying in the range 60° C. to 120° C. depending on the product, and is equal to 70° C. in the present embodiment.

As shown in FIG. 2A, the extrusion die 20 preferably comprises an uncooled first section 21 adjacent to the downstream end of the screw extruder 10 and followed by at least one cooling section 22. In this embodiment, the extrusion die has two cooling sections 22. It may typically have a length of 5.

These multiple cooling stages serve to adapt the cooling curve to the behavior of the product so as to obtain the desired texture at the end of the die.

The uncooled section 21 of the extrusion die 20 generally serves to texture the resulting product.

A difference of about 30° C. is maintained between the cooling fluid and the matter travelling inside the extrusion die 20. The die is preferably cooled by counterflow means.

The temperature of the product obtained at the outlet from said die lies in the range about 20° C. to about 30° C. depending on the desired firmness.

A rotary knife 30 is then used to cut up the product to the desired length directly on leaving the outlet of the extrusion die 20.

In another embodiment of the invention, as shown in FIG. 3A, the installation includes a coextrusion head 25 that opens out into the extrusion die 20.

The coextrusion device thus makes it possible to coextrude two different substances so as to obtain a composite food product.

The matter used for the filling is preferably inserted by means of the extrusion head 25. It must remain solid in spite of being warmed up in the coextrusion zone, and it must be capable of being inserted cold, in particular to cool the case as constituted by the extruded cheese or cheese speciality. In general, the behavior of the filling as a function of temperature should be close to that of the cheese or the cheese speciality constituting the case.

A pump (not shown) or an extruder is associated with the head 25 and is adapted to deliver a semisolid substance for the purpose of injecting the filling at an instantaneous flow rate that is regular in spite of the considerable back pressure present in the extrusion die. The flow rate of the semisolid filling depends on the outlet speed of the cheese from the cooker-extruder.

Because the firmness of the product is increased as it cools in the die 20, the product is kept under pressure within the die and inside the sheath 11. The pressure lies in the range about $10^4$ Pa to about $50 \times 10^4$ Pa, and is equal to $6 \times 10^4$ Pa to $12 \times 10^4$ Pa in the present embodiment.

There follows a description of the method of continuously manufacturing a cheese or a cheese speciality starting from curds and implemented in the above-described installation. The method comprises the following steps:

a) inserting raw materials including at least broken curds into the screw extruder 10 via its feed orifice 13;

b) transferring the raw materials from the upstream end towards the downstream end of the sheath, with the configuration of the screws and the temperature inside the sheath being adapted to transforming the raw materials by operations of mixing, texturing, and cooking;

c) extruding the resulting product from the downstream end of the sheath 11 via a die 20 adapted to texturing, shaping, and cooling the product; and d) cutting up the extruded cheese 50 or cheese speciality to the desired length.

Because of the configuration of the screws 12 and because of the thermal profile inside the sheath 11, the raw materials transferred inside the sheath 11 are subjected successively to a step in which they are compressed, mixed, and heated to a temperature of about 120° C., to a step in which they are sheared and mixed, followed by a decompression step at a temperature lying in the range 55° C. to 120° C. depending on the product, a step in which they are compressed, mixed, and heated to a temperature lying in the range 55° C. to 85° C. depending on the product, and to a step in which the product is sheared, mixed, and transferred into the die at a temperature lying in the range 50° C. to 120° C., depending on the product.

The various steps mentioned above correspond respectively to the compression zone B, C, D, the shear zone E, the expansion zone F, the compression zone G, and the transfer zone H, I, J.

The raw materials fed into the screw extruder 10 are thus mixed, textured, and heated to obtain a cheese-type texture. Initially, in the cooker-extruder installation, the raw material is destructured, and then a new texture is made similar to that of cheese, by means of additives, the applied heat treatment, and the mechanical effects implemented as the matter is being transferred.

Heating to above 70° C. makes it possible to stabilize the product, particularly bacteriologically speaking, by pasteurizing it.

In addition to curds, the raw materials may include water, salt, milk products, substitution products, texturing, coloring, or flavoring agents, jelling agents, antioxidants, or emulsifiers.

By way of non-limiting example, the milk products may be serum proteins, caseinates, milk fats, or powdered milk.

The term "substitution product" is used to designate fats of vegetable origin, vegetal proteins, starch, or gelatin.

Texturing agents such as starch or emulsifying salt can also be included in the raw materials.

Other substances such as ham, or chopped dried fruit may optionally be added to the curds in order to flavor the cheese speciality obtained by the method.

By way of example, a suitable raw material comprises: curds drained at 48 hours and broken, having a dry extract content greater than 38%, e.g. 53%, and a fat content relative to the dry extract lying in the range about 28% to about 62%, and preferably equal to 45%. The pH of the curds lies in the range about 5.05 to about 5.80, and is preferably equal to about 5.20. Also, the chloride content may lie in the range about 1% to about 1.5%, and is preferably equal to about 1.20%.

As mentioned above, the curds may be replaced by or combined with the residue from milk ultrafiltration.

The dry extract content of the curds and/of the residue may be greater than 38%, for example.

Additives for obtaining the desired texture may be added to this base material. For example, the final mixture may include about 2% of emulsifying salts, about 1.5% of gelatin, about 2.5% starch, about 20% water, and about 1.5% salts.

In an advantageous version of the invention, the method also includes a step e) of ripening the cheese or cheese speciality 50 as obtained from step d).

For this purpose, the surface of the cheese can be seeded in conventional manner with ripening flora.

With reference to FIG. 3A, the cheese or cheese speciality 50 can be filled during extrusion step c) with a filling 51 injected via a coextrusion head 25 that opens out into the die 20.

The filling is preferably inserted at a temperature less than about 25° C. so as to cool the outer case of cheese or cheese speciality.

The filling used may be based on cheese, flavoring, meat, fish, . . . . .

After extrusion step c), it is also possible to coat the cheese or cheese speciality 50 in a coating substance, such as cereals or other edible solid substances.

It is also possible to obtain a three-layer product, made up of inner filling, a case of cheese or cheese speciality, and a covering.

The food product obtained by the above-described method has the taste and texture of a cheese or a cheese speciality. As shown in FIGS. 2B, 2C, 3B, and 3C, the product is characterized by the fact that it is prepared continuously in a screw extruder heated to the range 60° C. to 120° C. depending on the product and followed by an extrusion die, with the raw material being broken curd and/or residue. The curd and/or residue has a dry extract content greater than 38%.

The cheese-type food product has a shape corresponding to the cross-section of the extrusion die 20.

In the examples of FIGS. 2B and 2C, the section is full and round. It could equally well be in the shape of a heart, a parallelogram, or some other shape.

In the example shown in FIGS. 3B and 3C, corresponding to use of a coextrusion die, the food product is in the form of a tube comprising an outer case 50 made of cheese or cheese speciality, together with internal filling 51.

Naturally, different cross-sections could equally well be provided by changing the section of the extrusion die 20.

In general, the cross-section of the food product will be inscribed within a circle whose diameter lies in the range a few mm to about 65 mm.

The length of the food product may lie in the range about 1 mm to about 30 cm. This length may be modified in the embodiment shown in FIG. 2A by increasing or decreasing the speed of rotation of the rotary knife 30.

Naturally, the slicer could be different. The clean slice obtained by the rotary knife could be replaced by pinching so as to obtain a final product in the form of a pillow.

For a product having a filling as obtained by coextrusion, the pinching variant makes it possible with appropriate mechanical treatment of the product to enclose the filling completely inside the product.

In addition, a plurality of cooling dies may be disposed in parallel at the outlet of the screw sheath.

Each extrusion die may include more than two cooling sections.

We claim:

1. A method of continuously manufacturing a cheese or a cheese specialty from curds and/or the residue of milk ultrafiltration, wherein the method comprises the following steps:
   a) feeding non-processed raw materials necessary to manufacture a cheese, comprising at least broken curds and/or residue to a screw extruder having two screws that are substantially identical, meshing one within the other, and rotated in the same direction of rotation inside an elongate sheath;
   b) transferring the raw materials from an upstream end toward a downstream end of the sheath so as to be processed, the configuration of the screws and the temperature inside the sheath going from the upstream end towards the downstream end being adapted to subject the raw materials successively to a step in which they are compressed, mixed, and heated to a temperature of about 120° C.; a step in which they are sheared and mixed, followed by a decompression step at a temperature in the range 55° C. to 120° C.; a step of compression, mixing, and heating to a temperature in the range 55° C. to 120° C., and a step in which the product is sheared, mixed, and transferred into a die at a temperature in the range 50° C. to 120° C.;
   c) extruding the resulting product from the downstream end of the sheath through a die adapted to texture, shape, and cool the product; and
   d) cutting up the extruded cheese or cheese specialty to a desired length.

2. A manufacturing method according to claim 1, wherein the raw materials further include at least one member selected from the group consisting of water, salt, milk products, substitution products, texturing agents, coloring agents, flavoring agents, jelling agents, antioxidizers and emulsifiers.

3. A manufacturing method according to claim 1, further including a step e) of ripening the cheese or cheese specialty obtained in step d).

4. A manufacturing method according to claim 1, wherein in step c), the cheese or cheese specialty is filled, with a filling injected via a coextrusion head that opens out into the die.

5. A manufacturing method according to claim 4, wherein said filling is injected at a temperature of less than about 25° C.

6. A manufacturing method according to claim 1, wherein after step c), the cheese or cheese specialty is covered with a covering substance.

7. A manufacturing method according to claim 4, wherein the filling is made by extrusion.

8. In a manufacturing installation for cheese or a cheese specialty, comprising a screw extruder having two substantially identical screws meshing one in the other and rotated in the same direction of rotation inside an elongate sheath, a feed orifice disposed at an upstream end of the sheath, an extrusion die situated at a downstream end of said sheath, and a slicer disposed at an outlet from the extrusion die; the improvement comprising a metering device adapted to deliver broken curds and/or residue from milk ultrafiltration to the feed orifice at a predetermined rate, thermal means adapted to regulate the temperature inside the sheath and the extrusion die, said sheath including at least one section in which the temperature is in the range 60° C. to 120° C., the configuration of the screws and the temperature inside the sheath inside the extrusion die being adapted to transform raw materials comprising at least broken curds and/or residue from milk ultrafiltration into a cheese or a cheese specialty.

9. An installation according to claim 8, wherein the screw extruder comprises, from its upstream end toward its downstream end:
   a raw material feed first zone in which the temperature is equal to ambient temperature and the screws have very fine threads at a short pitch;
   a compression second zone in which the temperature increases going downstream over the range 15° C. to 120° C. and the screws have threads of decreasing thickness and of a pitch that decreases from a long value to a short value;
   a shear third zone in which the screws have a short reverse pitch;
   a decompression fourth zone in which the temperature is in the range 55° C. to 120° C.;
   a compression fifth zone in which the screws have a very short pitch, the temperature being maintained in the range 55° C. to 120° C.; and a transfer sixth zone in which the screws have a short pitch and include at least one shear section in which the screws have a reverse pitch.

10. An installation according to claim 8, wherein said device for metering curds is a single-screw weight metering device.

11. An installation according to claim 8, wherein the extrusion die comprises an uncooled first section adjacent to the downstream end of the screw extruder followed by at least one cooling section.

12. An installation according to claim 8, wherein a coextrusion head opens out into the extrusion die.

13. An installation according to claim 12, wherein the coextrusion head is associated with an extruder.

* * * * *